(12) United States Patent
Onoda et al.

(10) Patent No.: US 11,795,868 B2
(45) Date of Patent: Oct. 24, 2023

(54) DIESEL ENGINE PISTON AND DIESEL ENGINE

(71) Applicant: Komatsu Ltd., Tokyo (JP)

(72) Inventors: Naoki Onoda, Tokyo (JP); Akira Ito, Tokyo (JP); Tomohiro Shimazu, Tokyo (JP); Satoru Mimura, Tokyo (JP); Takashi Kuribara, Tokyo (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 17/798,367

(22) PCT Filed: May 7, 2021

(86) PCT No.: PCT/JP2021/017508
§ 371 (c)(1),
(2) Date: Aug. 9, 2022

(87) PCT Pub. No.: WO2021/235241
PCT Pub. Date: Nov. 25, 2021

(65) Prior Publication Data
US 2023/0061825 A1     Mar. 2, 2023

(30) Foreign Application Priority Data

May 19, 2020   (JP) .................. 2020-087389

(51) Int. Cl.
*F02B 23/06* (2006.01)
*F02F 3/26* (2006.01)

(52) U.S. Cl.
CPC ...... *F02B 23/0672* (2013.01); *F02B 23/0651* (2013.01); *F02B 23/0669* (2013.01); *F02B 23/0696* (2013.01); *F02F 3/26* (2013.01)

(58) Field of Classification Search
CPC .............. F02B 23/0672; F02B 23/0651; F02B 23/0696; F02F 3/26
See application file for complete search history.

(56) References Cited

U.S. PATENT DOCUMENTS

| | | | |
|---|---|---|---|
| 11,098,676 B1 * | 8/2021 | Vassallo | .................... F02F 3/26 |
| 2012/0234285 A1 * | 9/2012 | Venugopal | .......... F02B 23/0669 123/193.6 |

(Continued)

FOREIGN PATENT DOCUMENTS

| JP | 2010-101244 A | 5/2010 |
|---|---|---|
| JP | 2016-502033 A | 1/2016 |

(Continued)

*Primary Examiner* — Long T Tran
(74) *Attorney, Agent, or Firm* — Locke Lord LLP

(57) ABSTRACT

This piston for a diesel engine includes: a bottom portion that has a deepest combustion chamber bottom in the combustion chamber; a circumferential protrusion that is provided around an entire circumference of a circumferential wall between the bottom portion and a top surface of the piston and protrudes toward an intersection (P0) of a center line of the piston and the top surface in a cross-sectional view that includes the center line; an inclination portion that inclines closer to the top surface toward an outer side in a radial direction from the circumferential protrusion; and a rising portion that rises from the inclination portion toward the top surface.

9 Claims, 12 Drawing Sheets

(56) References Cited

U.S. PATENT DOCUMENTS

| | | | |
|---|---|---|---|
| 2013/0036998 A1* | 2/2013 | Cornwell | F02B 23/0669 |
| | | | 123/193.6 |
| 2017/0145901 A1 | 5/2017 | Uehara et al. | |
| 2017/0167459 A1* | 6/2017 | Martinez | F02M 61/182 |
| 2019/0040789 A1* | 2/2019 | De Paola | F02B 23/0693 |
| 2019/0153976 A1* | 5/2019 | Díaz-Blanco | F02B 23/0672 |
| 2020/0232380 A1* | 7/2020 | Kim | F02D 35/028 |
| 2020/0340391 A1 | 10/2020 | Machold et al. | |
| 2020/0392919 A1 | 12/2020 | Kim et al. | |

FOREIGN PATENT DOCUMENTS

| | | |
|---|---|---|
| JP | 6241479 B2 | 12/2017 |
| JP | 2019-507848 A | 3/2019 |
| JP | 6519633 B2 | 5/2019 |
| WO | 2014/108400 A1 | 7/2014 |
| WO | 2015/177897 A1 | 11/2015 |
| WO | 2019/013221 A1 | 1/2019 |

\* cited by examiner

DIESEL ENGINE PISTON AND DIESEL ENGINE

TECHNICAL FIELD

The present invention relates to a diesel engine piston and a diesel engine.

Priority is claimed on Japanese Patent Application No. 2020-087389, filed May 19, 2020, the content of which is incorporated herein by reference.

BACKGROUND ART

In order to comply with exhaust gas regulations, diesel engines have a configuration equipped with a diesel particulate filter (DPF) that collects particulate matter in exhaust gas. In such a configuration, it is necessary to reduce black smoke emitted from an engine in order to avoid blockage of the DPF due to the black smoke emitted from the engine.

On the other hand, social demands for $CO_2$ reduction to prevent global warming are increasing year by year, and reduction of $CO_2$ emission achieved by reducing a fuel consumption rate of diesel engines is required.

For example, in Patent Document 1 below, a configuration having a central protrusion that forms a bottom wall of a combustion chamber and protrudes toward a fuel injection nozzle, a circumferential protrusion that is formed in a protrusion shape toward the fuel injection nozzle over the entire circumference of a circumferential wall between the bottom wall and a top portion, and an edge portion that has a reentrant angle on the circumferential wall in the range from a portion having a diameter larger than the circumferential protrusion on a side of the top portion of the circumferential protrusion to the top portion is disclosed.

For example, in Patent Document 2 below, a configuration in which, in a diesel engine including a piston that has a reentrant type cavity on a crown surface and a fuel injection nozzle that is disposed on a center line of the cavity, a lip portion having the smallest diameter at an inlet of the cavity is located below an opening edge, and a pocket portion formed of a space enlarged on an outer peripheral side of the piston is formed above the lip portion is disclosed.

For example, in Patent Document 3 below, a configuration in which a cavity formed on a crown surface of a piston has a two-state structure of a first cavity portion in a center region of the crown surface in a radial direction and a second cavity portion having a depth in an axial direction of a cylinder which is shallower than that of the first cavity portion and disposed on an outer peripheral side in the radial direction is disclosed.

RELATED ART DOCUMENT

Patent Document

[Patent Document 1]
  Japanese Unexamined Patent Application, First Publication No. 2010-101244
[Patent Document 2]
  Japanese Patent No. 6241479
[Patent Document 3]
  Japanese Patent No. 6519633

SUMMARY

Problems to be Solved by the Invention

In the case of Patent Document 1, if the reentrant angle of the edge portion is too large, fuel spray is largely returned to a central portion of the combustion chamber. In this case, the fuel spray may interfere with a liquid column (direct spray), resulting in an increase in black smoke due to lack of air and an increase in a fuel consumption rate.

In the case of Patent Document 2, if the diameter of the opening edge of the pocket portion on the crown surface of the piston is larger than the diameter of the lip portion, a large amount of spray proceeds in a cylinder direction (a radially outward direction of the cylinder). In this case, fuel may not be burned or heat energy may be lost, resulting in an increase in a fuel consumption rate.

In the case of Patent Document 3, if the depth of the second cavity portion is too shallow, air-fuel mixtures flowing along a surface shape of the second cavity portion interfere with each other, resulting in an increase in black smoke due to lack of air and an increase in a fuel consumption rate.

Therefore, an object of the present invention is to provide a diesel engine piston and a diesel engine in which generation of black smoke can be reduced and a fuel consumption rate can be reduced.

Means for Solving the Problem

A piston for a diesel engine according to an aspect of the present invention, which is a piston for a diesel engine that has a combustion chamber in which fuel is injected directly from a fuel injection nozzle, includes: a bottom portion that has a deepest combustion chamber bottom in the combustion chamber; a circumferential protrusion that is provided around an entire circumference of a circumferential wall between the bottom portion and a top surface of the piston and protrudes toward an intersection P0 of a center line of the piston and the top surface in a cross-sectional view that includes the center line; an inclination portion that inclines closer to the top surface toward an outer side in a radial direction from the circumferential protrusion; and a rising portion that rises from the inclination portion toward the top surface, wherein fuel injection from the fuel injection nozzle is performed at a portion of the inclination portion near the circumferential protrusion by lowering the piston, and wherein, in the cross-sectional view, when a shortest distance between the center line and the rising portion is L0, a distance between an intersection of an extension line of the inclination portion and an extension line of the rising portion and the top surface is H1, a shortest distance between the intersection P0 and the circumferential protrusion is L1, and an angle formed between a straight line orthogonal to the center line and the extension line of the inclination portion is A1, the following conditions (1) and (2) are satisfied.

When $L0$ is 100, $L0:H1:L1=100:9\pm5:83\pm5$    (1)

20 degrees$\leq A1 \leq$40 degrees    (2)

Advantage of the Invention

According to the above aspect, it is possible to reduce generation of black smoke and to reduce a fuel consumption rate.

DESCRIPTION OF THE EMBODIMENTS

Hereinafter, an embodiment of the present invention will be described with reference to the drawings. In the embodiment, a fuel linear injection type diesel engine will be described as an example of an engine. For example, diesel engines are used in various construction machines such as dump trucks, bulldozers, hydraulic excavators, and wheel loaders, or drive devices for large generators.

<Diesel Engine>

Figure 1:
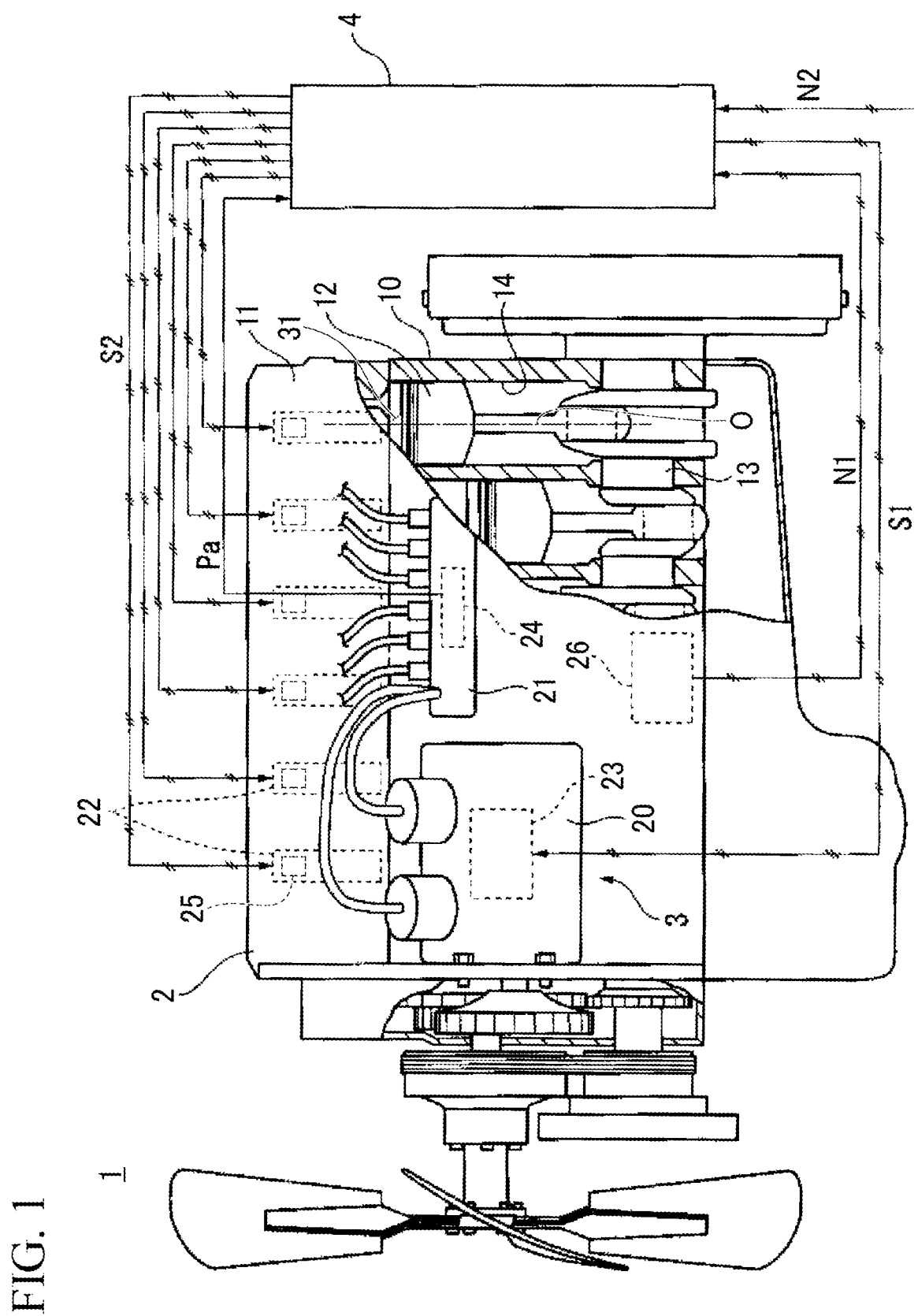
FIG. 1 is a partial cross-sectional view of a diesel engine according to an embodiment.

As shown in FIG. 1, the diesel engine 1 includes an engine main body 2 and a fuel injection device 3 for supplying fuel to the engine main body 2. Each element of the diesel engine 1 including the fuel injection device 3 is controlled by a control device 4.

The engine main body 2 includes a cylinder block 10, a cylinder head 11, a piston 12, and a crankshaft 13.

A plurality of cylinders 14 are provided inside the cylinder block 10.

The cylinder head 11 is fixed to an upper portion of the cylinder block 10 with a fastening member such as a bolt.

The piston 12 reciprocates in each of the cylinders 14 under the pressure of combustion gas burned inside the cylinders 14. A plurality of pistons 12 are provided to correspond to the cylinders 14.

The crankshaft 13 converts the reciprocating motion of the piston 12 into a rotary motion.

The fuel injection device 3 includes a pump 20, a common rail 21, and a fuel injection nozzle 22.

The pump 20 and the common rail 21 are attached to the outer wall of the cylinder block 10.

The pump 20 sends out fuel to be injected into a combustion chamber 31 of the diesel engine 1 at a high pressure. The pump 20 is provided with a discharge amount control valve 23 that controls the discharge amount of fuel from the pump 20.

The common rail 21 stores fuel at a pressure (a fuel pressure) generated by the pump 20. The common rail 21 is provided with a pressure sensor 24 that detects the pressure of the fuel stored in the common rail 21. A detection signal from the pressure sensor 24 is sent to the control device 4.

The fuel injection nozzle 22 is disposed in the cylinder head 11. The fuel injection nozzle 22 injects the fuel from the common rail 21 into each cylinder. The fuel injection nozzle 22 is provided with a fuel injection control valve 25 that controls fuel injection from the fuel injection nozzle 22.

Figure 6:
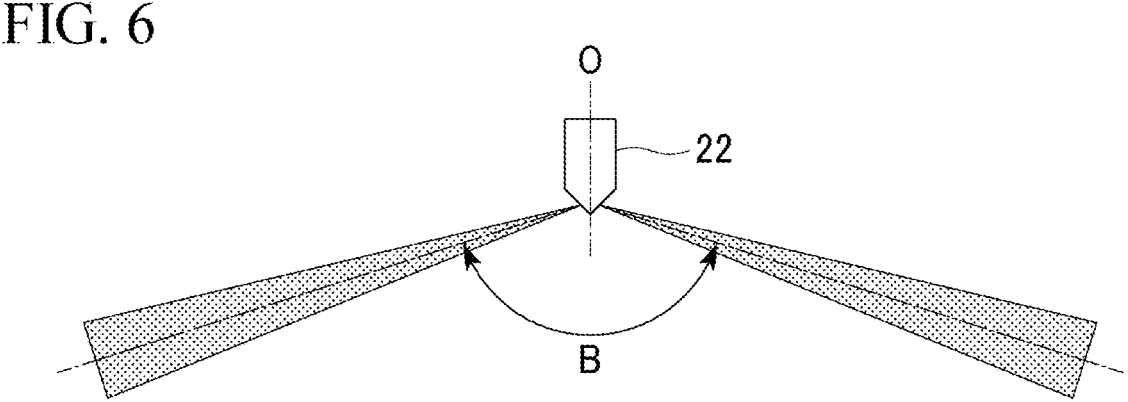
FIG. 6 is an explanatory view of an injection angle of a fuel injection nozzle according to the embodiment.

The fuel injection nozzle 22 is disposed on the center line O of the piston 12. In the present embodiment, as shown in FIG. 6, a fuel injection angle B from the fuel injection nozzle 22 is set in a range of 139 degrees≤B≤154 degrees. When viewed from a direction orthogonal to the center line O of the piston 12, the injection angle B corresponds to an angle formed by the center of a spray width of the fuel injected from the fuel injection nozzle 22 to one side (the center line of one fuel spray) and the center of a spray width of the fuel injected from the fuel injection nozzle 22 to the other side (the center line of the other fuel spray).

Figure 7:
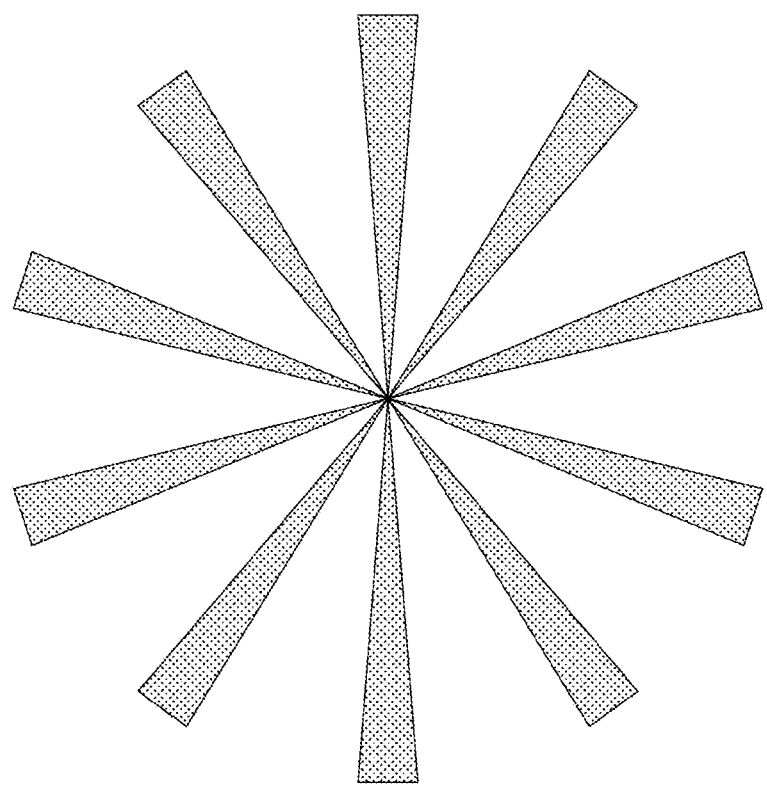
FIG. 7 is an explanatory view of the number of injection holes of the fuel injection nozzle according to the embodiment.

A plurality of injection holes for injecting fuel are provided at the end portion of the fuel injection nozzle 22. For example, as shown in FIG. 7, the number of injection holes is set in a range of 8 to 12. In the present embodiment, the number of injection holes is 10. The fuel injection nozzle 22 injects fuel radially from the ten injection holes.

The number of injection holes is not limited to the above and may be changed according to the diameters of the cylinder 14 and the piston 12, the spread angle of the injected fuel, and the like.

The control device 4 includes, for example, a microprocessor (MPU: micro-processing unit) or the like. As shown in FIG. 1, a rotation speed signal N1 from a rotation sensor 26 is input to the control device 4 in order to detect the rotation speed of the diesel engine 1. Further, an opening signal N2 from an accelerator pedal, a fuel injection amount setting dial, or the like is input to the control device 4 in order to detect the load of the diesel engine 1.

The control device 4 outputs an opening and closing signal S1 to the discharge amount control valve 23 to control an opening and closing timing of the discharge amount control valve 23 such that the detection signal of the pressure sensor 24 (the actual pressure Pa of the fuel stored in the common rail 21) becomes an optimum rail pressure set according to the rotation speed and the load of the diesel engine 1.

Further, the control device 4 outputs a control pulse S2 to the fuel injection control valve 25 to control the fuel injection from the fuel injection nozzle 22 on the basis of a fuel injection timing (an injection start timing) and a fuel injection period (a fuel injection amount) set according to the rotation speed and the load of the diesel engine 1.

<Piston>

Figure 2:
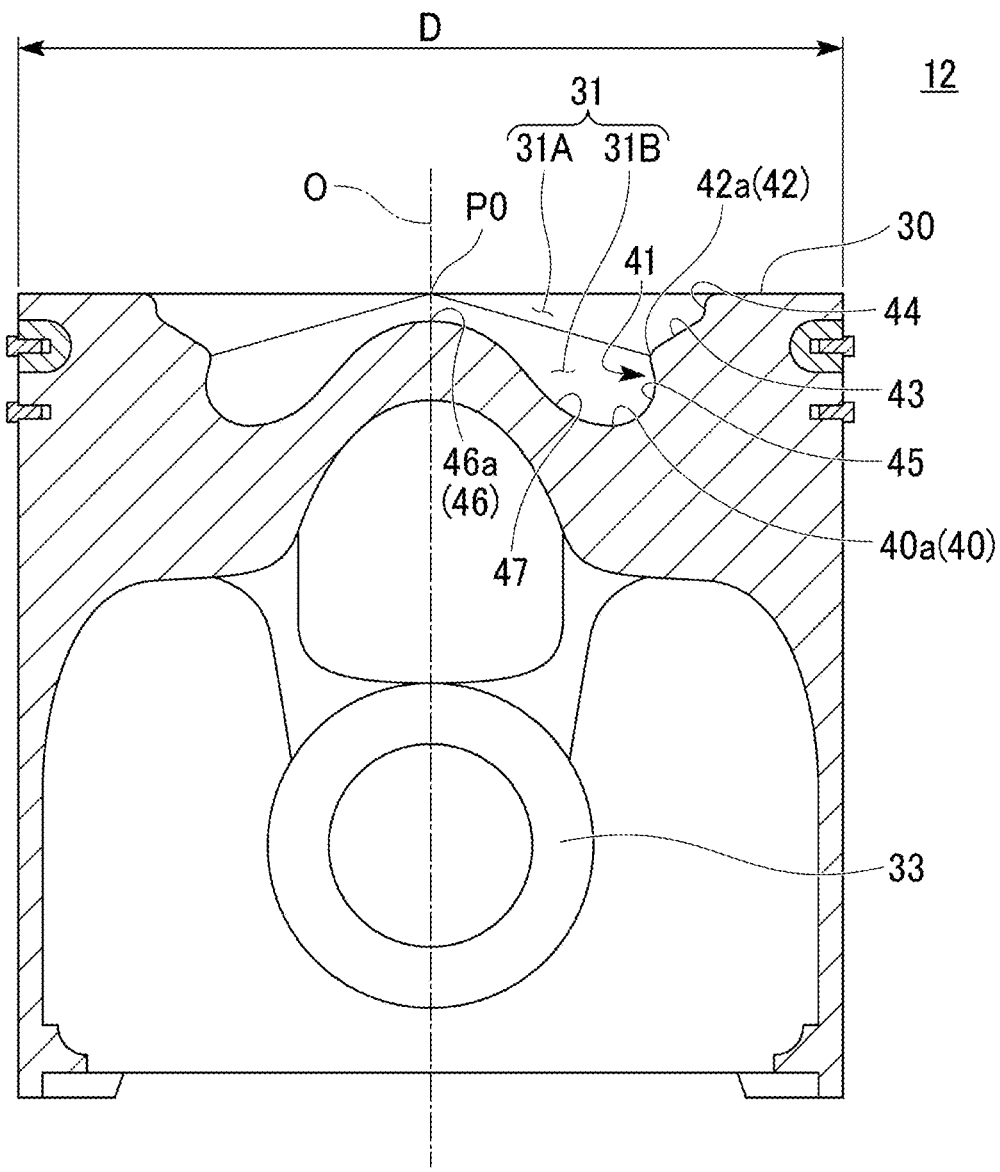
FIG. 2 is a cross-sectional view including a center line of a piston according to the embodiment.
Figure 5:
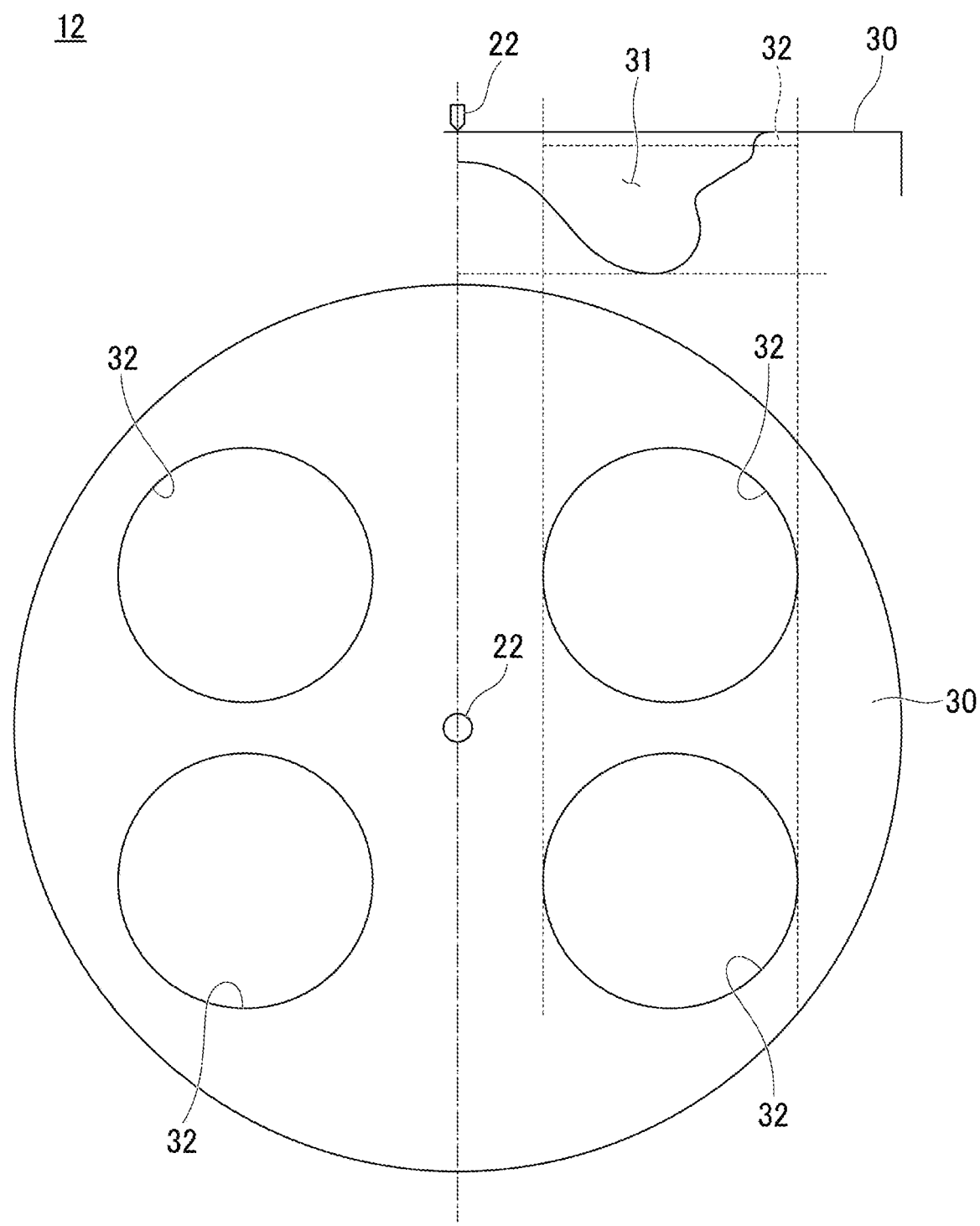
FIG. 5 is an explanatory view of a top surface of the piston according to the embodiment.

As shown in FIG. 2, the piston 12 has the combustion chamber 31 that is open toward the cylinder head 11 (see FIG. 3) at a top surface 30 of the piston 12. The top surface 30 of the piston 12 is a surface having no counterbore 32 for preventing interference with an intake valve and an exhaust valve (not shown). As shown in FIG. 5, a plurality of (for example, four) counterbores 32 are provided in the surface of the piston 12 facing the cylinder head 11 (see FIG. 3).

As shown in FIG. 2, the combustion chamber 31 is recessed from a side of the top surface 30 of the piston 12 toward a side of a pin boss 33. The combustion chamber 31 has a rotating body shape centered on the center line O of the piston 12.

Figure 4:
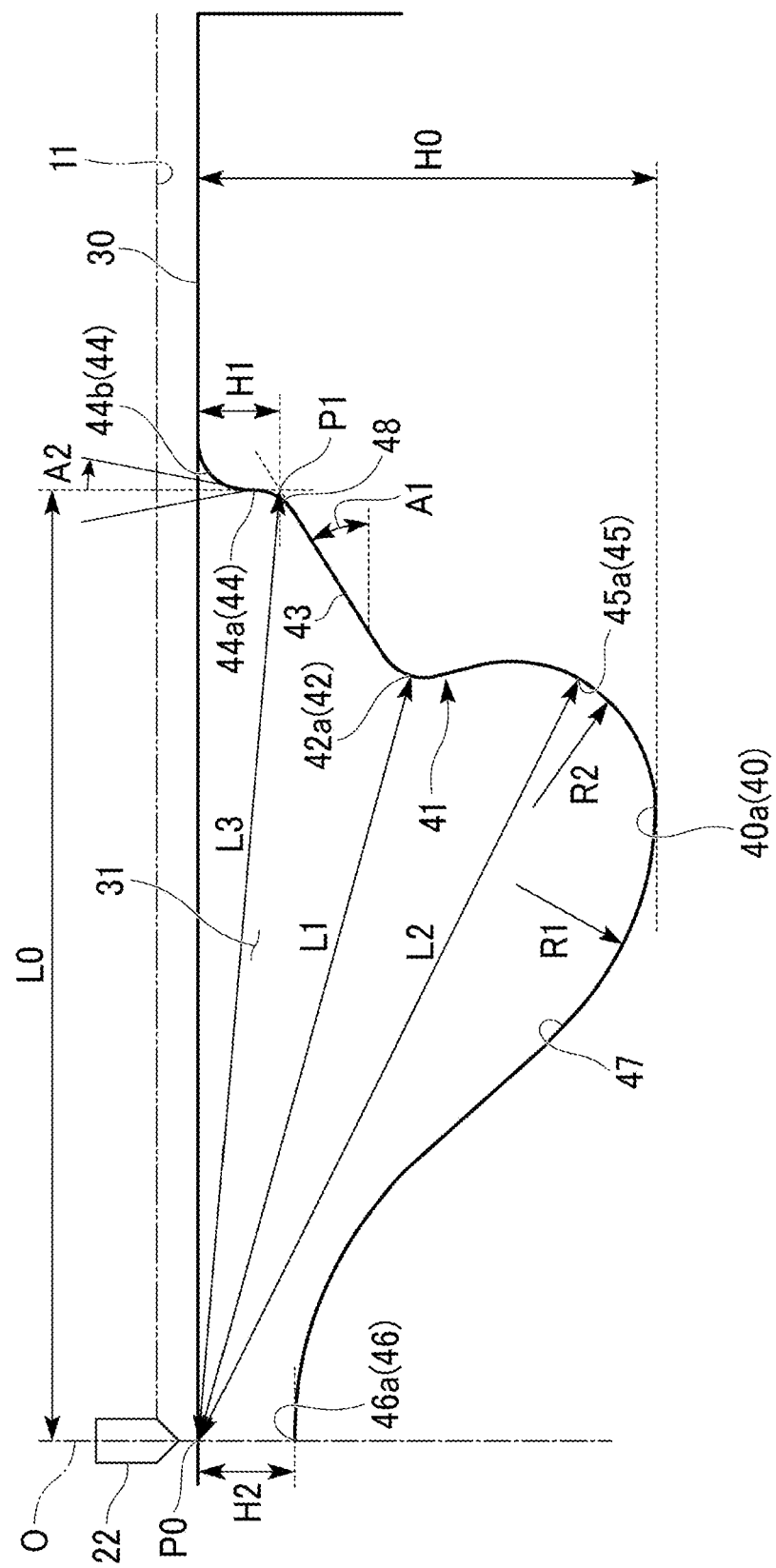
FIG. 4 is an explanatory view of the piston according to the embodiment.

FIG. 4 is a cross-sectional view including the center line O of the piston 12, which shows a part of the piston 12 of the embodiment. In FIG. 4, the cross-section hatch is omitted.

The piston 12 includes a bottom portion 40, a circumferential protrusion 42, an inclination portion 43, a rising portion 44, an outer bottom curved portion 45, a central protrusion 46, and an inner bottom curved portion 47.

Figure 3:
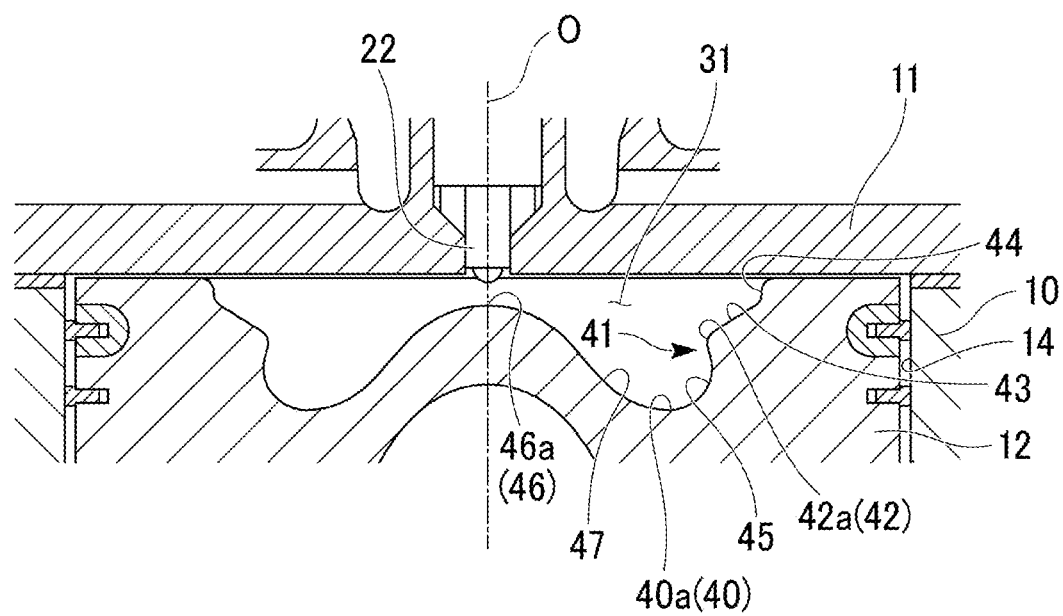
FIG. 3 is an explanatory view of a combustion chamber according to the embodiment.

Hereinafter, a direction along the center line O of the piston 12 is referred to as an "axial direction," a direction orthogonal to the center line O is referred to as a "radial direction," and a direction around the center line O is referred to as a "circumferential direction." As shown in FIG. 3, the axial direction corresponds to an axial direction of the cylinder 14.

As shown in FIG. 4, the bottom portion 40 has a deepest combustion chamber bottom 40a in the combustion chamber 31. In other words, the combustion chamber bottom 40a is a portion of the bottom portion 40 which is farthest from the top surface 30 of the piston 12 in the axial direction.

The circumferential protrusion 42 is provided over the entire circumference of the circumferential wall 41 between the bottom portion 40 and the top surface 30 of the piston 12. The circumferential protrusion 42 protrudes toward an intersection P0 between the center line O and the top surface 30 in the cross-sectional view including the center line O of the piston 12 (hereinafter, simply referred to as a "cross-sectional view"). The circumferential protrusion 42 is curved in an arc shape toward the intersection P0 in the cross-sectional view.

An apex 42a of the circumferential protrusion 42 is disposed between an apex 46a of the central protrusion 46 and the combustion chamber bottom 40a in the axial direction. Here, the apex 42a of the circumferential protrusion 42 is a portion (a protruding end) closest to the intersection P0 in the circumferential protrusion 42 in the cross-sectional view. The apex 42a of the circumferential protrusion 42 is disposed closer to the apex 46a of the central protrusion 46 than to the combustion chamber bottom 40a in the axial direction (a vertical direction in FIG. 4).

The inclination portion 43 linearly inclines closer to the top surface 30 toward an outer side in the radial direction from a portion of the circumferential protrusion 42 on a side of the top surface 30 in the cross-sectional view.

The rising portion 44 rises from an outer side portion of the inclination portion 43 in the radial direction toward the top surface 30. The rising portion 44 has an extending portion 44a that extends more steeply than the inclination portion 43 in the cross-sectional view and an edge portion 44b that connects the extending portion 44a and the top surface 30 and is curved in an arc shape toward the intersection P0 in the cross-sectional view.

Reference sign 48 in the figure indicates a connecting portion that connects the extending portion 44a and the inclination portion 43. The connecting portion 48 is curved in an arc shape toward an outer side of the combustion chamber 31 with respect to the intersection P0 in the cross-sectional view.

The outer bottom curved portion 45 is a portion that connects an outer side portion of the bottom portion 40 in the radial direction and a portion of the circumferential protrusion 42 on a side of the bottom portion 40. The outer bottom curved portion 45 is curved in an arc shape toward the outer side of the combustion chamber 31 with respect to the intersection P0 in the cross-sectional view.

The central protrusion 46 is provided at the center of the piston 12 in the radial direction. The central protrusion 46 protrudes from a side of the bottom portion 40 toward the fuel injection nozzle 22. The central protrusion 46 is curved in an arc shape toward the intersection P0 in the cross-sectional view. The apex 46a of the central protrusion 46 is disposed on the center line O.

The inner bottom curved portion 47 is a portion that connects an inner side portion of the bottom portion 40 in the radial direction and an outer side portion of the central protrusion 46 in the radial direction. The inner bottom curved portion 47 is curved in an arc shape toward a side opposite to the top surface 30 in the axial direction (a lower side in FIG. 4) and a side opposite side to the outer bottom curved portion 45 in the radial direction (a side of the center line O in FIG. 4) in the cross-sectional view. In the cross-sectional view, a radius of curvature R1 of the inner bottom curved portion 47 is larger than a radius of curvature R2 of the outer bottom curved portion 45 (R1>R2).

<Piston Dimension and the Like>

As shown in FIG. 2, an outer diameter D of the piston 12 is 90 mm or more, for example. In the present embodiment, the outer diameter D of the piston 12 is set in a range of 120 mm or more and 130 mm or less (for example, about 125 mm).

In the cross-sectional view, the combustion chamber 31 is divided by a line that connects the intersection P0 and the apex 42a of the circumferential protrusion 42, and a side of the top surface 30 of the divided combustion chamber 31 is a first combustion chamber 31A, and a side of the bottom portion 40 of the divided combustion chamber 31 is a second combustion chamber 31B.

A volume of the first combustion chamber 31A is a first volume V1, and a volume of the second combustion chamber 31B is a second volume V2. A ratio of the second volume V2 to the first volume V1 satisfies $45/55 \leq V2/V1 \leq 55/45$. It is more preferable that V2/V1 satisfy $48/52 \leq V2/V1 \leq 52/48$.

As shown in FIG. 4, in the cross-sectional view, an angle formed between a straight line orthogonal to the center line O and an extension line of the inclination portion 43 is A1 (an angle of the inclination portion 43). At this time, the angle A1 satisfies 20 degrees $\leq$ A1 $\leq$ 40 degrees. It is more preferable that the angle A1 satisfy 25 degrees $\leq$ A1 $\leq$ 35 degrees.

In the cross-sectional view, an angle formed between a straight line parallel to the center line O and an extension line of the extending portion 44a (the rising portion 44) is A2 (an angle of the rising portion 44). In the cross-sectional view, clockwise rotation (right-handed rotation) with respect to the straight line parallel to the center line O is a positive angle, and counterclockwise rotation (left-handed rotation) with respect to the straight line parallel to the center line O is a negative angle, the angle A2 satisfies $-10$ degrees $\leq$ A2 $\leq$ 10 degrees. It is more preferable that the angle A2 satisfy $-5$ degrees $\leq$ A2 $\leq$ 5 degrees. In the present embodiment, the angle A2 satisfies 0 degrees $\leq$ A2 $\leq$ 5 degrees.

In the cross-sectional view, the shortest distance between the center line O and the rising portion 44 is L0. In the present embodiment, since the angle A2 is 0 degrees $\leq$ A2 $\leq$ 5 degrees, the distance L0 corresponds to the length of a straight line that connects a portion of the rising portion 44 near the inclination portion 43 and the center line O. In other words, the distance L0 is the shortest distance between the center line O and the rising portion 44 in the radial direction.

In the cross-sectional view, a distance between the top surface 30 and the combustion chamber bottom 40a is H0. The distance H0 corresponds to a depth at the deepest portion in the combustion chamber 31. A ratio of the distances L0 and H0 satisfies L0:H0=100:48±5. It is more preferable that the ratio of the distances L0 and H0 satisfy L0:H0=100:48±2.

In the cross-sectional view, a distance between an intersection P1 of the extension line of the inclination portion 43 and the extension line of the extending portion 44a and the top surface 30 is H1. The distance H1 is a length between the intersection P1 and the top surface 30 in the axial direction. A ratio of the distances L0 and H1 satisfies L0:H1=100:9±5. It is more preferable that the ratio of the distances L0 and H1 satisfy L0:H1=100:9±2.

In the cross-sectional view, the shortest distance between the intersection P0 and the circumferential protrusion 42 is L1. The distance L1 is a length of a straight line that connects the apex 42a of the circumferential protrusion 42 and the intersection P0 in the cross-sectional view. A ratio of the distances L0 and L1 satisfies L0:L1=100:83±5. It is more preferable that the ratio of the distances L0 and L1 satisfy L0:L1=100:83±2.

In the cross-sectional view, the shortest distance between the top surface 30 and the central protrusion 46 is H2. The distance H2 is a length of a straight line that connects the apex 46a of the central protrusion 46 and the top surface 30 on the center line O in the cross-sectional view. A ratio of the distances L0 and H2 satisfies L0:H2=100:10±8. It is more preferable that the ratio of the distances L0 and H2 satisfy L0:H2=100:10±2.

In the cross-sectional view, the longest distance between the intersection P0 and the outer bottom curved portion 45 is L2. The distance L2 is a length of a straight line that connects a portion of the outer bottom curved portion 45 which is farthest from the intersection P0 (an apex 45a of the outer bottom curved portion 45) and the intersection P0 in the cross-sectional view. A ratio of the distances L0 and L2 satisfies L0:L2=100:90±5. It is more preferable that the ratio of the distances L0 and L2 satisfy L0:L2=100:90±2.

In the cross-sectional view, a distance between the intersection P0 and the intersection P1 of the extension line of the inclination portion 43 and the extension line of the rising portion 44 is L3. The relationship between the distances L1, L2 and L3 satisfies L1<L2<L3.

<Fuel Injection from Fuel Injection Nozzle>

The fuel injection from the fuel injection nozzle 22 starts at the end of a piston compression process. The fuel injection from the fuel injection nozzle 22 is performed at a portion of the outer bottom curved portion 45 near the circumferential protrusion 42 when the piston 12 is at a top dead point. The fuel injection from the fuel injection nozzle 22 is performed at a portion of the inclination portion 43 near the circumferential protrusion 42 due to the descent of the piston 12.

Figure 8:
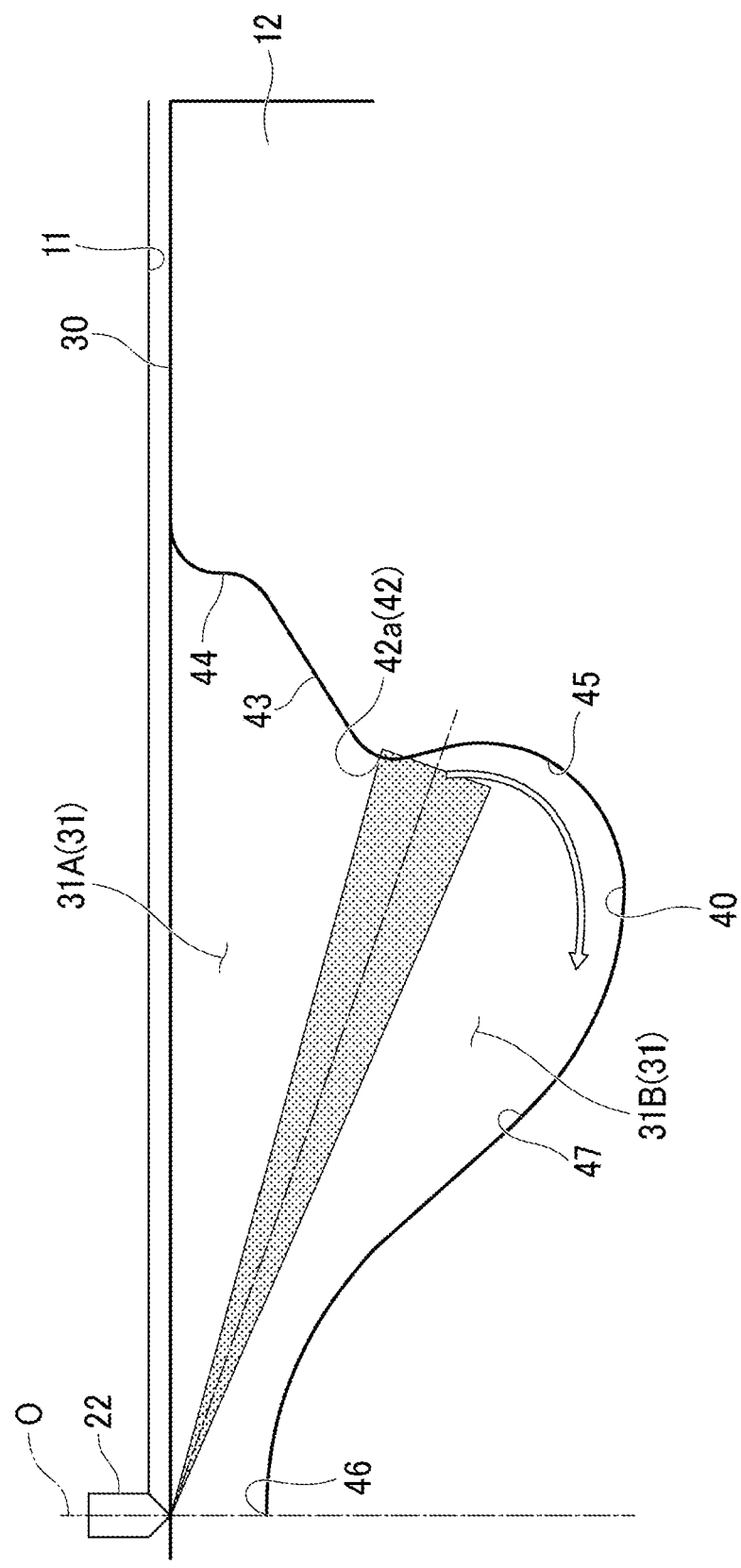
FIG. 8 is an explanatory view of control of fuel injection (fuel injection at −15 to 5 degrees after a top dead point) from the fuel injection nozzle according to the embodiment.

As shown in FIG. 8, the fuel injection from the fuel injection nozzle 22 is performed toward the second combustion chamber 31B at −15 to 5 degrees after a top dead point.

Figure 9:
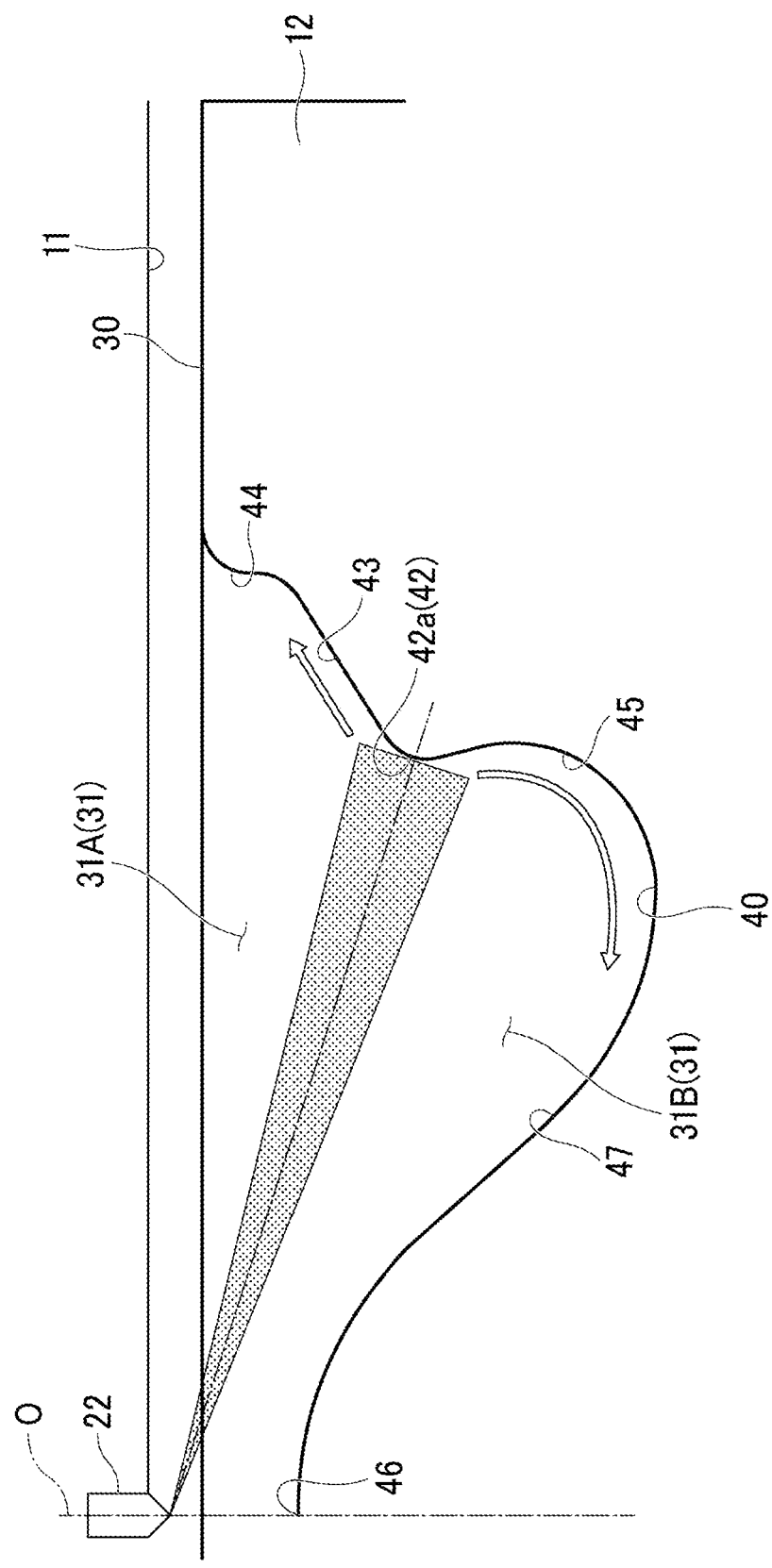
FIG. 9 is an explanatory view of control of fuel injection (fuel injection at 0 to 15 degrees after a top dead point) from the fuel injection nozzle following FIG. 8.

As shown in FIG. 9, the fuel injection from the fuel injection nozzle 22 is performed toward the circumferential protrusion 42 at 0 to 15 degrees after a top dead point. In the present embodiment, the fuel injection from the fuel injection nozzle 22 is performed toward the apex 42a of the circumferential protrusion 42 at 8 degrees after a top dead point.

Figure 10:
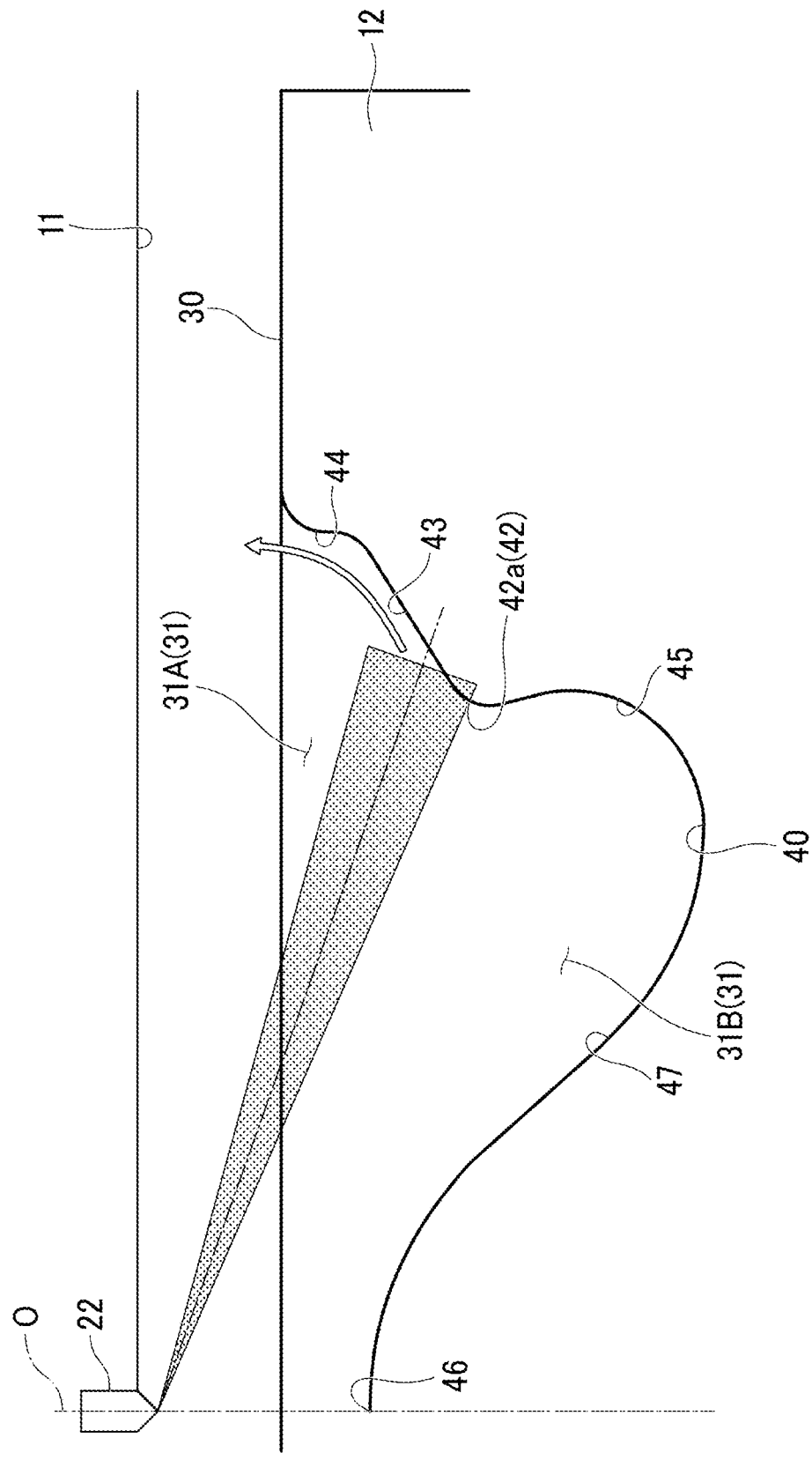
FIG. 10 is an explanatory view of control of fuel injection (fuel injection at 5 to 30 degrees after a top dead point) from the fuel injection nozzle following FIG. 9.

As shown in FIG. 10, the fuel injection from the fuel injection nozzle 22 is performed toward the first combustion chamber 31A at 5 to 30 degrees after a top dead point.

Here, a period after the injection to the second combustion chamber 31B starts firstly until the center of the fuel spray reaches the apex 42a of the circumferential protrusion 42 is referred to as a "fuel injection first-half period," and a period after the center of the fuel spray reaches the apex 42a of the circumferential protrusion 42 until the injection ends is referred to as a "fuel injection latter-half period."

As shown in FIG. 8, in the fuel injection first-half period, the spray of the fuel injected from the fuel injection nozzle 22 is injected toward a portion of the outer bottom curved portion 45 near the circumferential protrusion 42. Then, the spray of the fuel flows in an arrow direction along the outer bottom curved portion 45 and the bottom portion 40. Therefore, in the fuel injection first-half period, most of the fuel is supplied into the second combustion chamber 31B and burns.

As shown in FIG. 10, in the fuel injection latter-half period, the spray of the fuel injected from the fuel injection nozzle 22 is injected toward a portion of the inclination portion 43 near the circumferential protrusion 42. Then, the spray of the fuel flows in an arrow direction along the inclination portion 43 and the rising portion 44. Therefore, in the fuel injection latter-half period, most of the fuel is supplied into the first combustion chamber 31A and burns.

The spray at this time is continuously ejected from the supply stage to the second combustion chamber 31B.

<Operational Effect>

As described above, the piston 12 of the present embodiment, which is a piston 12 for a diesel engine 1 that has a combustion chamber 31 in which fuel is injected directly from a fuel injection nozzle 22, includes: a bottom portion 40 that has a deepest combustion chamber bottom 40a in the combustion chamber 31; a circumferential protrusion 42 that is provided around an entire circumference of a circumferential wall 41 between the bottom portion 40 and a top surface 30 of the piston 12 and protrudes toward an intersection P0 of a center line O of the piston 12 and the top surface 30 in a cross-sectional view that includes the center line O; an inclination portion 43 that inclines closer to the top surface 30 toward an outer side in a radial direction from the circumferential protrusion 42; and a rising portion 44 that rises from the inclination portion 43 toward the top surface 30. The fuel injection from the fuel injection nozzle 22 is performed at a portion of the inclination portion 43 near the circumferential protrusion 42 due to the descent of the piston 12. In the cross-sectional view, when a shortest distance between the center line O and the rising portion 44 is L0, a distance between an intersection P1 of an extension line of the inclination portion 43 and an extension line of the rising portion 44 and the top surface 30 is H1, a shortest distance between the intersection P0 and the circumferential protrusion 42 is L1, and an angle formed between a straight line orthogonal to the center line O and the extension line of the inclination portion 43 is A1, the following conditions (1) and (2) are satisfied.

When $L0$ is 100, $L0:H1:L1=100:9\pm5:83\pm5$ (1)

20 degrees≤$A1$≤40 degrees (2)

Figure 11:
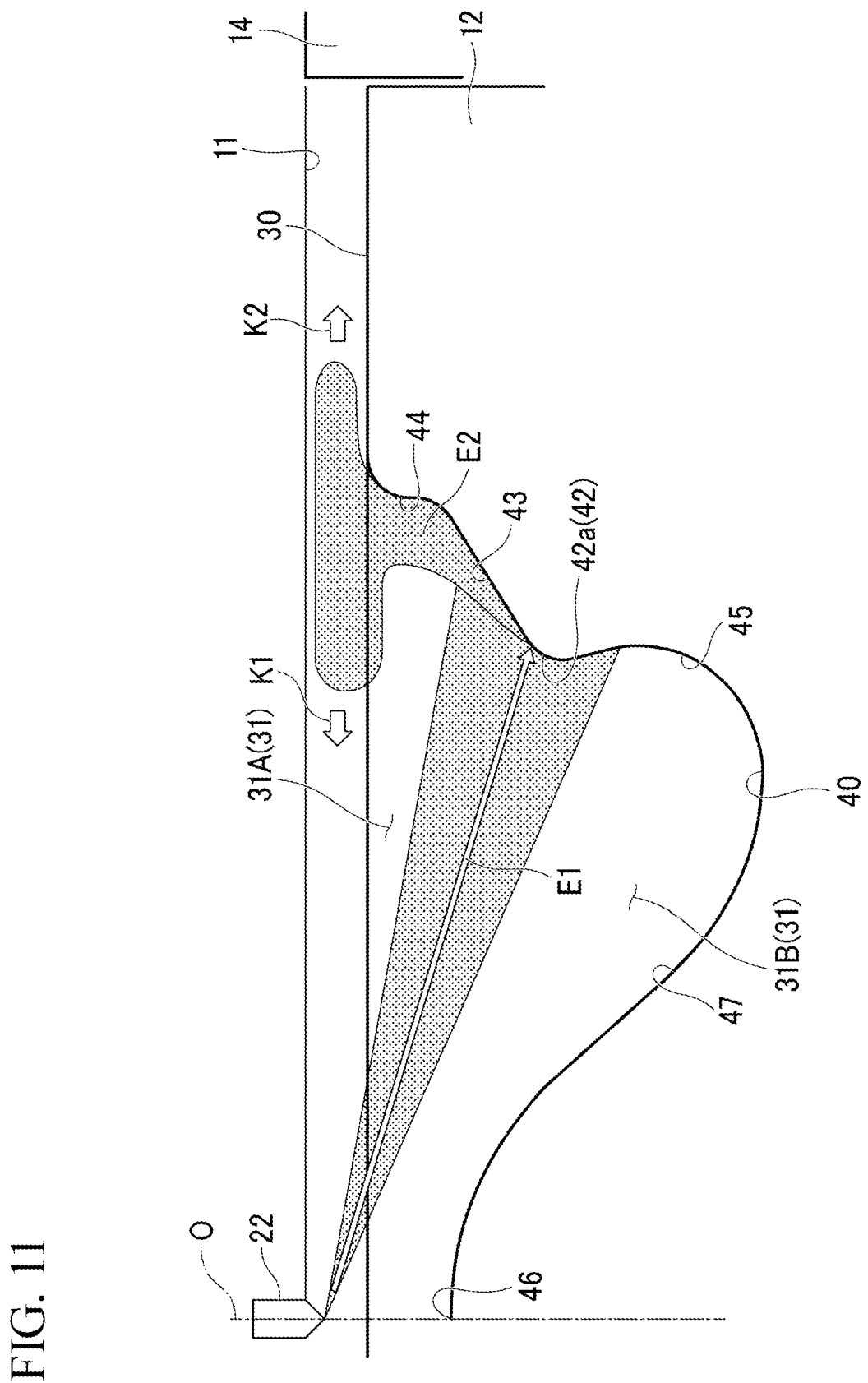
FIG. 11 is an explanatory view of an operation depending on a circumferential protrusion, an inclination portion, and a rising portion of the piston according to the embodiment.

As shown in FIG. 11, in the present embodiment, the fuel injection from the fuel injection nozzle 22 is performed at a portion of the inclination portion 43 near the circumferential protrusion 42 by lowering the piston 12, and thus, in the combustion chamber 31, direct spray E1 toward a portion of the inclination portion 43 near the circumferential protrusion 42, and roll-up spray E2 that rolls up along the inclination portion 43 and the rising portion 44 are formed. The above conditions (1) and (2) are satisfied, an appropriate distance is provided between the direct spray E1 and the roll-up spray E2. That is, the interference between the direct spray E1 and the roll-up spray E2 is curbed. As a result, air can be suitably taken in, and thus the combustion speed is improved. Therefore, it is possible to reduce the generation of the black smoke and to reduce the fuel consumption rate.

Further, in the present embodiment, the diesel engine 1 includes a cylinder 14 and the above-mentioned piston 12 provided to be movable in an axial direction of the cylinder 14. The piston 12 has a top surface 30 facing a lower surface of a cylinder head 11. In this case, the roll-up spray E2 proceeds to be divided in a radially inward direction and a cylinder direction (a radially outward direction) of the cylinder 14 along the lower surface of the cylinder head 11. That is, the rising portion 44 allows the roll-up spray E2 to proceed in a wide range. Therefore, it is possible to effectively use the air, to further reduce the generation of the black smoke, and to further reduce the fuel consumption rate.

Figure 12:
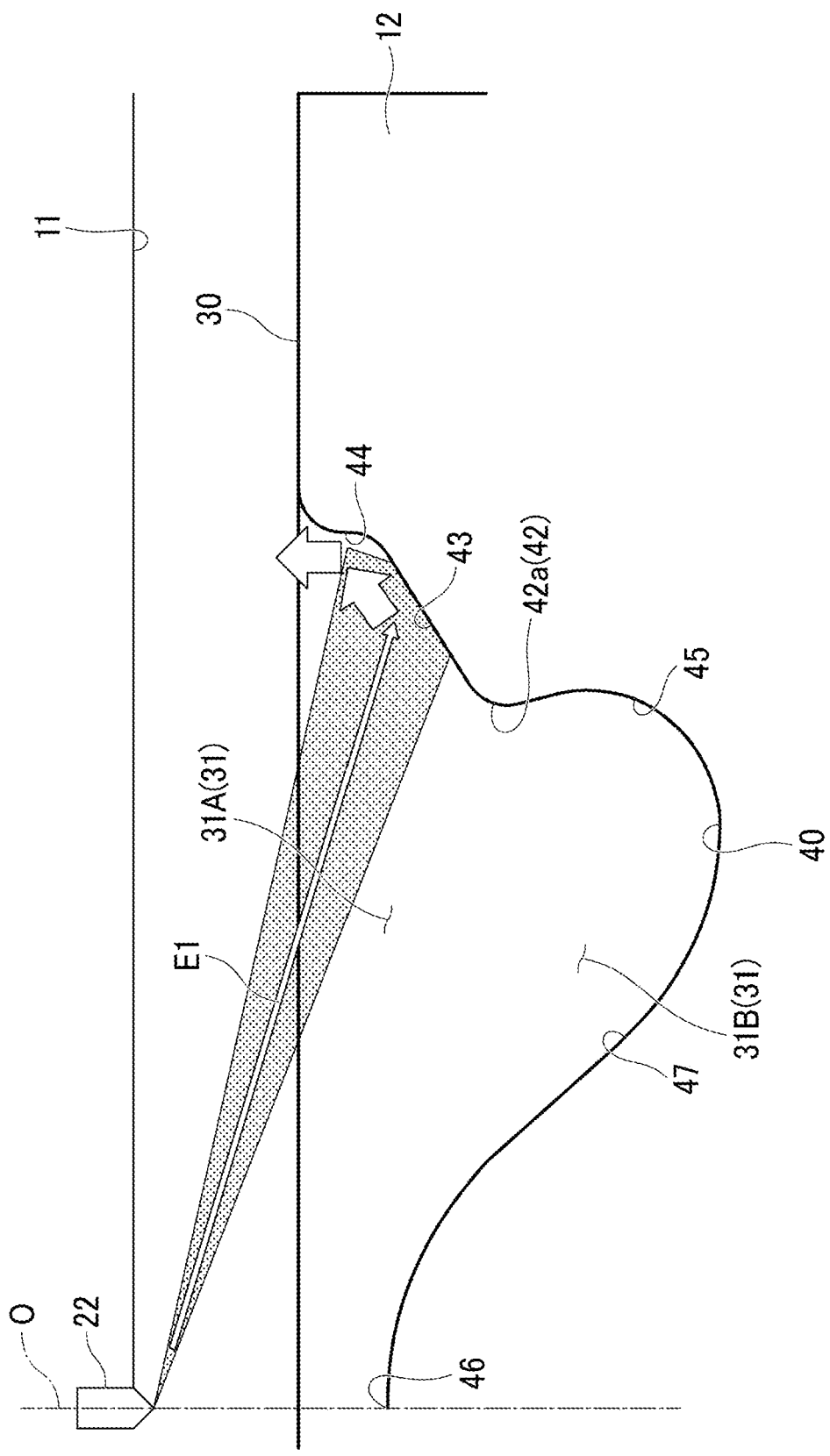
FIG. 12 is an explanatory view of an operation depending on a length of the inclination portion of the piston according to the embodiment.

Further, in the present embodiment, when $L0:L1=100:83\pm5$ is satisfied, the inclination portion 43 having an appropriate length can be obtained. As a result, as shown in FIG. 12, the spray E1 injected to the portion of the inclination portion 43 near the circumferential protrusion 42 due to the descent of the piston 12 maintains turning toward the top surface 30 (upward). That is, it is possible to prevent the spray from turning toward the bottom portion 40 (downward) and to prevent the fuel from being guided to a space where the residual amount of oxygen is already small. Therefore, it is possible to improve the combustion efficiency and to further reduce the generation of the black smoke.

In the present embodiment, in the cross-sectional view, when an angle formed between a straight line parallel to the center line O and the extension line of the rising portion 44 is A2, clockwise rotation with respect to the straight line parallel to the center line O is a positive angle, and counterclockwise rotation with respect to the straight line parallel to the center line O is a negative angle, $-10$ degrees$\leq A2\leq 10$ degrees is satisfied.

Therefore, as shown in FIG. 11, it is possible to prevent the fuel spray from being largely returned in a radial center direction K1 as compared with the case of $A2<-10$ degrees. As a result, it is possible to curb an increase in the black smoke and an increase in the fuel consumption rate due to lack of air caused by the interference between the fuel spray and the return spray.

In addition, it is possible to curb the progress of a large amount of spray in the cylinder direction K2 (a radially outward direction of the cylinder 14) as compared with the case of $A2>10$ degrees. As a result, it is possible to curb unburned fuel and loss of heat energy and to curb an increase in the fuel consumption rate.

In the present embodiment, an outer bottom curved portion 45 that connects the bottom portion 40 and the circumferential protrusion 42 and is curved toward an outer side of the combustion chamber 31 with respect to the intersection P0 in the cross-sectional view is further provided. The fuel injection from the fuel injection nozzle 22 is performed at a portion of the outer bottom curved portion 45 near the circumferential protrusion 42 when the piston 12 is at a top dead point. In the cross-sectional view, when a longest distance between the intersection P0 and the outer bottom curved portion 45 is L2, and a distance between the top surface 30 and the combustion chamber bottom 40a is H0, $L0:L2:H0=100:90\pm5:48\pm5$ is satisfied.

Figure 13:
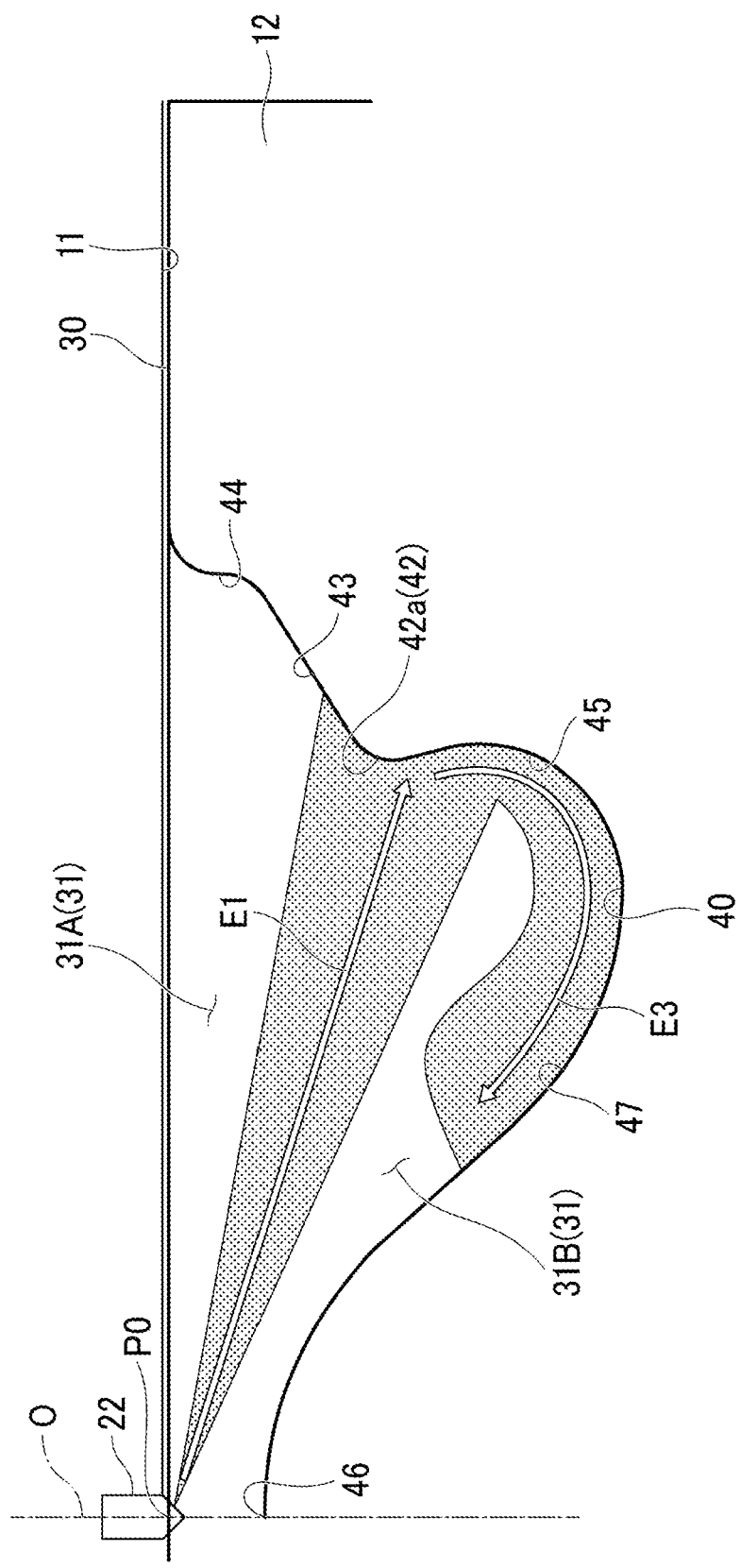
FIG. 13 is an explanatory view of an operation of an outer bottom curved portion of the piston according to the embodiment.

Therefore, as shown in FIG. 13, the direct spray E1 toward a portion of the outer bottom curved portion 45 toward the circumferential protrusion 42, and the return spray E3 returned along the outer bottom curved portion 45 and the bottom portion 40 are formed in the combustion chamber 31. In the case of the present embodiment, when $L0:L2:H0=100:90\pm5:48\pm5$ is satisfied, an appropriate distance is provided between the direct spray E1 and the return spray E3. That is, the interference between the direct spray E1 and the return spray E3 is curbed. As a result, air can be suitably taken in, and thus the combustion speed is improved. Therefore, it is possible to further reduce the generation of the black smoke and to further reduce the fuel consumption rate.

In the present embodiment, a central protrusion 46 which is provided in a center of the piston 12 in the radial direction and protrudes from a side of the bottom portion 40 toward the fuel injection nozzle 22; and an inner bottom curved portion 47 that connects the bottom portion 40 and the central protrusion 46 and is curved in the cross-sectional view are further provided. In the cross-sectional view, a radius of curvature R1 of the inner bottom curved portion 47 is larger than a radius of curvature R2 of the outer bottom curved portion 45 ($R1>R2$).

Therefore, as shown in FIG. 13, it is possible to more effectively curb the interference between the direct spray E1 and the return spray E3 as compared with the case where the radius of curvature R1 of the inner bottom curved portion 47 is equal to or less than the radius of curvature R2 of the outer bottom curved portion 45 ($R1\leq R2$). As a result, air can be more suitably taken in, and thus the combustion speed is further improved. Therefore, it is possible to further reduce the generation of the black smoke and to further reduce the fuel consumption rate.

In the present embodiment, in the cross-sectional view, when a shortest distance between the top surface 30 and the central protrusion 46 is H2, $L0:H2=100:10\pm8$ is satisfied.

Therefore, it is possible to appropriately reduce a region that is not so involved in combustion. Therefore, it contributes to the improvement of combustion efficiency.

In the present embodiment, in the cross-sectional view, when a distance between the intersection P0 and the intersection P1 of the extension line of the inclination portion 43 and the extension line of the rising portion 44 is L3, $L1<L2<L3$ is satisfied.

Therefore, as shown in FIG. 11, it is possible to prevent the fuel spray from being largely returned in the radial center direction K1 as compared with the case of $L1<L3<L2$. As a result, it is possible to curb an increase in the black smoke and an increase in the fuel consumption rate due to lack of air caused by the interference between the fuel spray and the return spray.

In the present embodiment, in the cross-sectional view, the combustion chamber 31 is divided by a line that connects the intersection P0 and the apex 42a of the circumferential protrusion 42, and a side of the top surface 30 of the divided combustion chamber 31 is a first combustion chamber 31A, and a side of the bottom portion 40 of the divided combustion chamber 31 is a second combustion chamber 31B. The fuel injection from the fuel injection nozzle 22 is performed toward the second combustion chamber 31B at $-15$ to 5 degrees after a top dead point, is performed toward the circumferential protrusion 42 at 0 to 15 degrees after a top dead point, and is performed toward the first combustion chamber 31A at 5 to 30 degrees after a top dead point. According to this configuration, the fuel can be injected into the space where the burned gas is not present by injecting the fuel spray into the second combustion chamber 31B and the first combustion chamber 31A separately. Therefore, it is possible to increase the chance of contact between the fuel and the air and to shorten the combustion period. Therefore, it is possible to further reduce the generation of the black smoke and to further reduce the fuel consumption rate.

In the present embodiment, when a volume of the first combustion chamber 31A is a first volume V1, and a volume of the second combustion chamber 31B is a second volume V2, $45/55 \leq V2/V1 \leq 55/45$ is satisfied.

Therefore, as shown in FIG. 13, the interference between the direct spray E1 and the return spray E3 can be curbed, and as shown in FIG. 11, the interference between the direct spray E1 and the roll-up spray E2 can be curbed. As a result, it is possible to effectively use the air, to further reduce the generation of the black smoke, and to further reduce the fuel consumption rate.

In the present embodiment, an outer diameter D of the piston 12 is 90 mm or more.

Therefore, the circumferential protrusion 42 can be formed with high accuracy as compared with the case where the outer diameter D of the piston 12 is less than 90 mm. Therefore, it is possible to suitably perform the fuel spray to the combustion chambers 31A and 31B with the apex 42a of the circumferential protrusion 42 as a boundary.

OTHER EMBODIMENTS

In the above-described embodiment, an example in which the angle A2 satisfies $-10$ degrees $\leq A2 \leq 10$ degrees has been described, but the present invention is not limited to this. For example, the angle A2 may be less than $-10$ degrees. For example, the angle A2 may exceed 10 degrees.

In the above-described embodiment, an example in which the ratio of the distances L0, L2, and H0 satisfies L0:L2:H0=100:90±5:48±5 has been described, but the present invention is not limited to this. For example, the ratio of the distances L0, L2, and H0 may be set outside the above range.

In the above-described embodiment, an example in which, in the cross-sectional view, the radius of curvature R1 of the inner bottom curved portion 47 is larger than the radius of curvature R2 of the outer bottom curved portion 45 (R1>R2) has been described, but the present invention is not limited to this. For example, the radius of curvature R1 of the inner bottom curved portion 47 may be equal to or less than the radius of curvature R2 of the outer bottom curved portion 45 (R1<R2).

In the above-described embodiment, an example in which the ratio of the distances L0 and H2 satisfies L0:H2=100:10±8 has been described, but the present invention is not limited to this. For example, the ratio of the distances L0 and H2 may be set outside the above range.

In the above-described embodiment, an example in which the relationship between the distances L1, L2, and L3 satisfies L1<L2<L3 has been described, but the present invention is not limited to this. For example, the relationship between the distances L1, L2 and L3 may satisfy L1<L3<L2.

In the above-described embodiment, an example in which the fuel injection from the fuel injection nozzle 22 is performed toward the second combustion chamber 31B at $-15$ to 5 degrees after a top dead point, is performed toward the circumferential protrusion 42 at 0 to 15 degrees after a top dead point, and is performed toward the first combustion chamber 31A at 5 to 30 degrees after a top dead point has been described, but the present invention is not limited to this. For example, the timing of the fuel injection from the fuel injection nozzle 22 can be changed according to the required specifications.

In the above-described embodiment, an example in which the relationship between the first volume V1 and the second volume V2 satisfies $45/55 \leq V2/V1 \leq 55/45$ has been described, but the present invention is not limited to this. For example, the relationship between the first volume V1 and the second volume V2 may be set outside the above range.

In the above-described embodiment, an example in which the outer diameter D of the piston 12 is 90 mm or more has been described, but the present invention is not limited to this. For example, the outer diameter D of the piston 12 may be less than 90 mm.

In the above-described embodiment, an example in which the fuel injection in the fuel injection first-half period and the fuel injection latter-half period performed with the apex 42a of the circumferential protrusion 42 as a boundary is continuous has been described, but the present invention is not limited to this. For example, so-called pilot injection or after-injection in which the fuel injection first-half period is set as a first fuel injection and the fuel injection latter-half period is set as a second fuel injection that is intermittently performed with respect to the first fuel injection may be performed.

In the above-described embodiment, an example in which the center of the piston 12, the center of the combustion chamber 31, and the injection position of the fuel injection nozzle 22 are the same has been described, but the present invention is not limited to this. For example, the center of the combustion chamber 31 and the injection position of the fuel injection nozzle 22 may be offset (eccentric) with respect to the center of the piston 12.

In the above-described embodiment, an example in which the fuel injection timing is controlled according to the engine rotation speed and the engine load has been described, but the present invention is not limited to this. For example, the fuel injection timing may be controlled on the basis of only the engine rotation speed or only the engine load.

Although the embodiments of the present invention have been described above, the present invention is not limited to these, it is possible to make addition, omission, and replacement of configurations and other changes without departing from the spirit of the present invention, and it is also possible to appropriately combine the above-described embodiments.

BRIEF DESCRIPTION OF THE REFERENCE SYMBOLS

1 Diesel engine
12 Piston
14 Cylinder
22 Fuel injection nozzle
30 Top surface
31 Combustion chamber
31A First combustion chamber
31B Second combustion chamber
40 Bottom portion
40a Combustion chamber bottom
41 Circumferential wall
42 Circumferential protrusion
42a Apex of circumferential protrusion
43 Inclination portion
44 Rising portion
45 Outer bottom curved portion
46 Central protrusion
47 Inner bottom curved portion A1 Angle of inclination portion (angle formed between straight line orthogonal to center line and extension line of inclination portion in cross-sectional view)

A2 Angle of rising portion (angle formed between straight line parallel to center line and extension line of rising portion in cross-sectional view)

D Outer diameter of piston

H0 Distance between top surface and combustion chamber bottom in cross-sectional view H1 Distance between intersection P1 and top surface in cross-sectional view (distance between intersection of extension line of inclination portion and extension line of rising portion and top surface in cross-sectional view)

H2 Shortest distance between top surface and central protrusion in cross-sectional view L0 Shortest distance between center line and rising portion in cross-sectional view L1 Shortest distance between intersection P0 and circumferential protrusion in cross-sectional view L2 Longest distance between intersection P0 and outer bottom curved portion in cross-sectional view L3 Distance between intersection P0 and intersection P1 in cross-sectional view O Center line of piston P0 Intersection of center line and top surface in cross-sectional view P1 Intersection of extension line of inclination portion and extension line of rising portion in cross-sectional view R1 Radius of curvature of inner bottom curved portion in cross-sectional view R2 Radius of curvature of outer bottom curved portion in cross-sectional view V1 First volume V2 Second volume

The invention claimed is:

1. A piston for a diesel engine that has a combustion chamber in which fuel is injected directly from a fuel injection nozzle, comprising:
   a bottom portion that has a deepest combustion chamber bottom in the combustion chamber;
   a central protrusion which is provided in a center of the piston in a radial direction and protrudes from a side of the bottom portion toward the fuel injection nozzle;
   an inner bottom curved portion that connects the bottom portion and the central protrusion and is continuously curved along an entire length in a cross-sectional view,
   a circumferential protrusion that is provided around an entire circumference of a circumferential wall between the bottom portion and a top surface of the piston and protrudes toward an intersection P0 of a center line of the piston and the top surface in the cross-sectional view that includes the center line;
   an outer bottom curved portion that connects the bottom portion and the circumferential protrusion and is curved toward an outer side of the combustion chamber with respect to the intersection P0 in the cross-sectional view,
   an inclination portion that inclines closer to the top surface toward an outer side in a radial direction from the circumferential protrusion; and
   a rising portion that rises from the inclination portion toward the top surface,
   wherein fuel injection from the fuel injection nozzle is performed at a portion of the inclination portion near the circumferential protrusion by lowering the piston,
   wherein the fuel injection from the fuel injection nozzle is performed at a portion of the outer bottom curved portion near the circumferential protrusion when the piston is at a top dead point, and
   wherein, in the cross-sectional view, when a shortest distance between the center line and the rising portion is L0, a distance between an intersection of an extension line of the inclination portion and an extension line of the rising portion and the top surface is H1, a shortest distance between the intersection P0 and the circumferential protrusion is L1, and an angle formed between a straight line orthogonal to the center line and the extension line of the inclination portion is A1, the following conditions (1) and (2) are satisfied:

when L0 is 100, L0:H1:L1=100:9±5:83±5, and (1)

20 degrees ≤A1≤40 degrees, and (2)

wherein, in the cross-sectional view, when a longest distance between the intersection P0 and the outer bottom curved portion is L2, and a distance between the top surface and the combustion chamber bottom is H0, L0:L2:H0=100:90±5:48±5 is satisfied.

2. The piston for a diesel engine according to claim 1, wherein, in the cross-sectional view, when an angle formed between a straight line parallel to the center line and the extension line of the rising portion is A2, clockwise rotation with respect to the straight line parallel to the center line is a positive angle, and counterclockwise rotation with respect to the straight line parallel to the center line is a negative angle,
   −10 degrees ≤A2≤10 degrees is satisfied.

3. The piston for a diesel engine according to claim 1, wherein, in the cross-sectional view, a radius of curvature of the inner bottom curved portion is larger than a radius of curvature of the outer bottom curved portion.

4. The piston for a diesel engine according to claim 3, wherein, in the cross-sectional view, when a shortest distance between the top surface and the central protrusion is H2,
   L0:H2=100:10±8 is satisfied.

5. The piston for a diesel engine according to claim 1, wherein, in the cross-sectional view, when a distance between the intersection P0 and the intersection of the extension line of the inclination portion and the extension line of the rising portion is L3,
   L1 <L2<L3 is satisfied.

6. The piston for a diesel engine according to claim 1, wherein, when the combustion chamber is divided by a line that connects the intersection P0 and an apex of the circumferential protrusion in the cross-sectional view, a side of the top surface of the divided combustion chamber is a first combustion chamber, and a side of the bottom portion of the divided combustion chamber is a second combustion chamber,
   fuel injection from the fuel injection nozzle is performed toward the second combustion chamber at −15 to 5 degrees after a top dead point, is performed toward the circumferential protrusion at 0 to 15 degrees after a top dead point, and is performed toward the first combustion chamber at 5 to 30 degrees after a top dead point.

7. The piston for a diesel engine according to claim 6, wherein, when a volume of the first combustion chamber is a first volume V1, and a volume of the second combustion chamber is a second volume V2,
   45/55≤V2/V1≤55/45 is satisfied.

8. The piston for a diesel engine according to claim 1, wherein an outer diameter of the piston is 90 mm or more.

9. A diesel engine comprising:
a cylinder; and
a piston according to claim 1 which is provided to be movable in an axial direction of the cylinder.

\* \* \* \* \*